Feb. 7, 1956 J. A. VIERLING 2,733,890
ADJUSTABLE VALVE FOR LIQUIFIED PETROLEUM GAS LIGHTERS
Filed June 7, 1950

Inventor
JOHN A. VIERLING
By
Howard Fischer
Attorney

2,733,890

ADJUSTABLE VALVE FOR LIQUIFIED PETROLEUM GAS LIGHTERS

John A. Vierling, St. Paul, Minn., assignor to Brown & Bigelow, St. Paul, Minn., a corporation of Minnesota Application June 7, 1950, Serial No. 166,749

2 Claims. (Cl. 251—215)

My invention relates to the method of making an adjustable valve for liquified petroleum gas lighters, which comprises a sleeve and a cap screw processed by my method.

In carrying out my method, I provide two essential parts which include a sleeve member and a cap screw which, when processed by my method, is attached to the lower end of the sleeve in adjusted position. The first step of the method is carried out by drilling a small hole angularly extending through the sleeve, then upsetting the periphery of the lower end of the hole in the sleeve by a center punch which forms an annular raised portion around the drilled hole. Then the cap screw is attached to the sleeve in a firm, fixed position and the same size hole is drilled through the head of the cap screw so that the holes formed through the sleeve and through the cap screw are in alignment. Then the cap screw is drawn tighter against the bottom of the sleeve which operation places the holes in the sleeve and the cap screw out of alignment and virtually tangential to each other. This last adjustment in the method is regulated by the operator adjusting the valve so that the proper size flame may be secured from the nozzle valve of the lighter which is positioned above my adjustable valve when the lighter is assembled as will be more fully hereinafter set forth.

My adjustable valve includes the upper sleeve member with a cap screw secured in the lower portion thereof and threaded to the sleeve so that the cap screw can be adjusted in regulating the opening for the escapement of gas through the valve. The sleeve member is positioned in the body of the lighter and carries an O-ring of rubber or other suitable pliable material to prevent the leakage of gas around the upper end of the sleeve when in operating position.

My valve is adapted to be used in conjunction with a spring operated closure nozzle valve, the lower end of which fits into a top recess formed in my adjustable valve and which is also adapted to close the small opening drilled through the sleeve when the nozzle valve is closed by means of a rubber washer which seats in the recess over the drilled hole. This nozzle valve is also provided with an O-ring seal around the lower end of the same.

In the drawings I have only shown a small portion of the body of a lighter, and I have not illustrated the pyrophoric lighter element or any other form of lighter element which ignites the gas flowing through my valve and through the nozzle valve when the same is opened. It will be apparent that my valve is anchored in the body of the lighter, wherein a liquified petroleum fuel and gas pressure is stored ready to be used for a flame when the lighter is operated in the usual manner.

The important feature of my adjustable valve resides in the construction of the same, the simplicity thereof which is evidenced by two main parts, namely the sleeve and the cap screw which adjusts the opening in the valve. In this simple manner I provide a valve for controlling the flow of gas from the storage chamber of the lighter to the nozzle valve so that a flame can be obtained at the top of the nozzle valve when it is opened and the pyrophoric flint ignites the escaping gas.

In a valve of this character it is extremely important that the method be such that it can be carried out by ordinary employees in the manufacture of lighters employing a liquefied petroleum gas and pressure from a storage chamber. This I have accomplished by my two-piece adjustable valve and the method of making the same so as to provide a uniformity of adjustment thereof to secure the proper size flame for the lighter.

A further feature of my valve resides in the two-piece construction, namely the sleeve and the adjustable cap screw which by my method are formed with an aligned small hole for the gas to pass through, and wherein the cap screw of the valve can be adjusted to place the holes (that were aligned when the hole was drilled through the two parts) out of alignment to a degree where the minutest adjustment or micrometric adjustment may be made to control the size of the passageway through which the gas flows from the storage chamber of the lighter and then through the nozzle valve where it is ignited as hereinbefore stated.

It is extremely essential that a valve of this character be very simple. This I have accomplished with only two parts and by employing my method to complete these parts to form a valve. My valve is easily adjusted by unskilled labor, to give a low or high flame, and to prevent the flame from shooting higher when the lighter is first opened after it has remained inoperative for awhile.

I have found with my adjustable valve and the method of making and adjusting the same that I am able to make any number of valves which will give uniform adjustment, one with the other, which will continue to control the flame of each lighter manufactured owing to the method that I employ in the making of my adjustable valve.

Each of my valves are made up as heretofore stated of two parts and completed and set by my method, and then before they are placed in a lighter for service, are tested with the proper apparatus to set the openings in the valve to give a predetermined flame when the lighter is ignited. Then the valves are placed as a unit in the body of the lighter below the nozzle valve, the function of which is only to open and close the lighter to shut off the flow of gas through my valve unit. The closing of the nozzle valve by its spring shuts off the flame of the lighter.

The features, together with other objects and details of my invention will be more fully and clearly hereinafter set forth.

In the drawings forming part of this specification:

Figure 2:
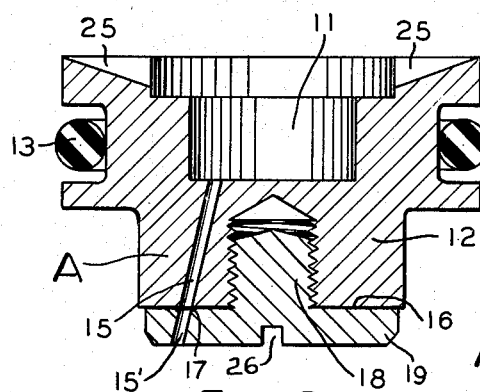
Figure 2 is a similar cross section showing the cap screw secured to the sleeve and in the position it assumes when the hole is continued through the head of the cap screw by a further operation.
Figure 4:
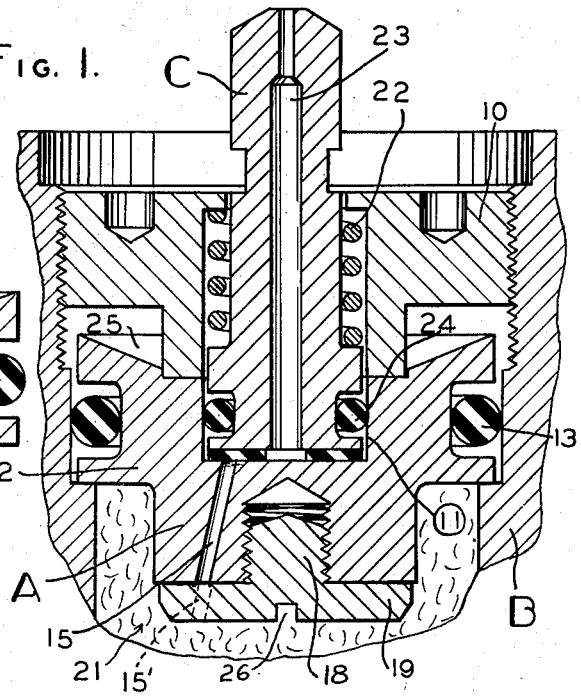
Figure 4 is a sectional view of the complete valve assembly of the lighter showing my valve unit held in position under the nozzle valve and with the gas escapement holes of my valve unit out of alignment, the hole in the head of the cap screw being shown in dotted lines and only a portion of the body of a lighter being illustrated.
Figure 6:
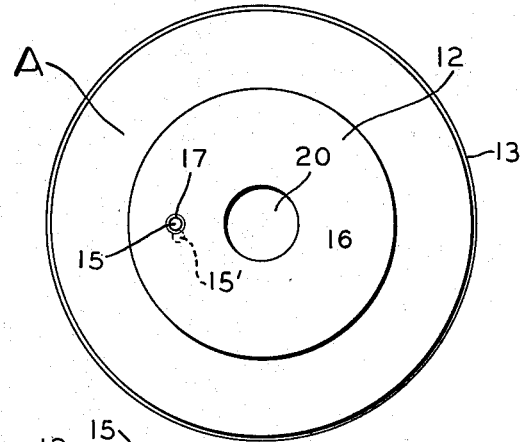

Figure 6 is a bottom view of Figure 2 with the cap screw removed and the inner end of the gas hole formed in the sleeve shown with a raised flange formed about the hole, also showing in dotted lines the relative position of the hole in the cap screw when the cap screw is in the adjusted position shown in Figure 4 with the holes of the valve unit out of alignment and virtually in tangential position.

The valve unit A is shown in a portion of the body B of a lighter where the unit is held by the sleeve nut 10 which also holds the nozzle valve unit C positioned above and extending into the recess 11 formed in the top of the valve unit A.

Figure 1:
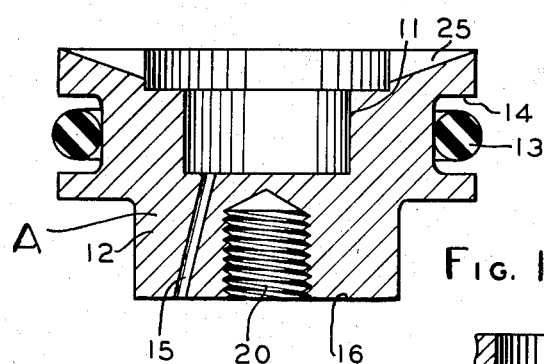
Figure 1 is a central cross section of the sleeve of my valve showing the small hole drilled angularly through the same, which illustrates the first step of my method consisting in providing the sleeve and drilling the hole therethrough.

In carrying out my method, I provide a valve sleeve member 12, shown in Figure 1, with a sealing O-ring 13 extending in a retaining groove 14 in the head of the sleeve 12. The recess 11 is formed in the top of the sleeve 12 for receiving the nozzle valve C as illustrated in Figure 4.

My method of making my valve unit A consists in providing the sleeve 12 and drilling a small hole 15 angularly extending from the lower surface of the recess 11 and out through the bottom 16 of the sleeve 12.

The next step of the method is carried out by placing a beveled center punch in the lower end of the hole 15 and tapping the center punch to form a small elevated flange or ridge 17 about the hole 15. The next step of the method consists in screwing the threaded shank 18 of the cap screw 19 into the threaded recess 20 formed in the bottom of the sleeve 12. When the cap screw 19 is firmly in place, screwed tightly against the bottom 16, a continuation of the hole 15 is formed through the head of the screw 19 to provide the passageway 15' in alignment with the passageway 15. The next step of my method resides in placing the valve unit assembly A as illustrated in Figure 2 into a fixture designed to pass gas or air pressure through the holes 15 and 15' and adjusting the screw 19 to misalign the holes 15 and 15' to a degree so as to set the valve unit A to a predetermined setting as illustrated in Figure 4. When the valve unit A is thus set by my method, gas can only escape from the storage chamber 21 of the liquified fuel under pressure through the passageways 15 and 15' at a predetermined rate when the nozzle valve C is lifted against its spring 22 to permit the gas to flow through the axial passageway 23 in the nozzle valve, whereupon the escaping gas is ignited by any suitable means, not shown, such as a pyrophoric flint or igniting element placed in the path of the escaping gas.

In carrying out my method in the setting of the valve unit A, I have found that a desirable setting of the holes 15 and 15' in relation to each other may be as indicated in Figure 6 where the hole 15' is virtually tangential to the hole 15. I have also found that the raised ridge 17 around the hole 15 is essential to insure the proper setting of the valve unit A. In reality, the ridge 17 is flattened by the inner surface of the cap screw 19 to a certain degree so that a complete metallic gas seal is formed around the adjacent portions of the respective holes 15 and 15'.

The valve units A and C are retained in place by the threaded sleeve nut 10 and a suitable sealing O-ring 24 is carried by the lower end of the nozzle valve C to shut off any escaping gas around the same.

An important feature in the construction and adjustment of my valve resides in the raised ridge or flange 17 which compensates for any inequalities of the surface 16 and the under surface of the cap screw 19. In manufacturing the sleeve 12 and the cap screw 19 (which ordinarily are made on screw machines), it is difficult in the speed of manufacture to make the surfaces 16 and the inner surface of the head of the cap screw 19 perfectly true. In fact, these surfaces may even show the forming tool marks if they are viewed under a magnifying glass. For this reason, the annular ridge 17 around the hole 15 is highly important because it provides sufficient upstanding metal around the hole 15 and in relation to the hole 15' so that in adjusting the valve unit A, the annular ridge 17 is flattened to conform with the inner surface of the head of the cap screw 19 and thus provides virtually a perfect seal around the inner edge of the hole 15, except where the hole 15' comes into a tangent position with the periphery of the hole 15.

In this manner, I provide a controllable seal in the valve unit A so that when the operator sets the valve unit A to provide the required amount of flow of gas through the holes 15 and 15' to the nozzle valve unit C, the operator is assured that the valve unit A can be easily adjusted without the exercise of expert skill and perfectly machined parts.

Figure 3:
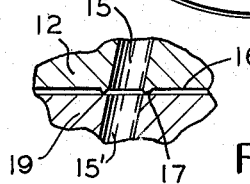
Figure 3 is an enlarged section detail through the holes formed in the sleeve and in the head of the cap screw and showing the upstanding flange or rim formed around the hole in the sleeve which is a further step of my method, carried out by placing a beveled center punch in the lower end of the hole of the sleeve and striking it to elevate the material of the sleeve around the hole.
Figure 5:
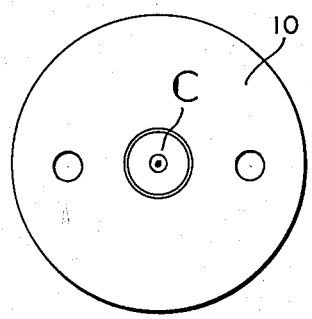
Figure 5 is a top view of the valve assembly without the casing of the lighter.

In carrying out my method, where I provide the sleeve 12, it is important that the surface 16 be such as to conform with the inner surface of the cap screw 19. However, the machine tools used in making these parts on screw machines or lathes, particularly where high speed manufacture is necessary, it is not possible to economically polish the surface 16 of the inner surface of the cap screw 19 to a perfect fit. Thus, I upset the inner end of the hole 15 as illustrated in the enlarged diagrammatic illustration in Figure 3, which shows the annular projecting ridge 17 extending around the lower end of the hole 15. Then when the valve unit A is adjusted by turning the cap screw 19 on the threads 20 of the sleeve 12, to set the holes 15 and 15' in proper relation to permit the correct amount of gas to escape from the chamber 21 through the holes 15 and 15', the annular ridge 17 is flattened or squeezed into shape to conform with the surface of the inner surface of the cap screw to give the proper gas seal between the passageways 15 and 15' and also to provide a frictional engagement between the sleeve 12 and the inner surface of the head of the cap screw 19. This frictional engagement with the ridge 17 operates to hold the cap screw 19 in set adjusted position.

The top of the sleeve 12 is formed with a slot 25 while the cap screw 19 is formed with a screw driver slot 26. These slots permit the unit A to be adjusted by engaging the slots 25 and 26 with the proper tools to permit the respective parts 12 and 19 to be adjusted in relation to each other in the setting of the valve unit A for the proper amount of flow of gas through the same.

It will be apparent that if the surface 16 of the sleeve 12 is polished to a smooth and true surface and the inner surface of the cap screw 19 which contacts the surface 16 is also finished in this manner so that the two surfaces are absolutely true in relation to each other to give a complete contact therebetween, then the ridge 17 would not be necessary because there would be virtually no leaking of gas between the surface 16 and the inner surface of the cap screw 19 when the cap screw 19 is screwed tight against the surface 16.

I claim:

1. An adjustable valve for liquified petroleum gas lighters, including a sleeve, a cap screw threaded into the bottom of said sleeve, a sealing O-ring recess formed in the wall of said sleeve, a small gas passageway formed through said sleeve to a point of contact with the inner surface of the head of said cap screw, an annular upstanding ridge formed about the lower end of said passageway in said sleeve on the bottom surface thereof, a passageway formed through the head of said cap screw while the cap screw is attached to said sleeve, said cap screw and sleeve being adjusted in relation to each other to flatten said annular ridge around said hole to conform with the inner surface of said cap screw adjacent the hole formed through said cap screw to permit said sleeve and cap screw to be adjusted in relation to each other to regulate the flow of gas from a storage chamber through the passageways formed in said sleeve and the head of said cap screw.

2. In an adjustable valve, a sleeve member having a threaded hole formed therein and a smooth bottom end portion, a cap member having a threaded shank portion positioned in said hole of said sleeve with the cap portion against said bottom of said sleeve, said cap and said sleeve having a hole formed axially therethrough when the same are together, said holes being movable in and out of register with each other for the control of gas passing therethrough and between said cap and said bottom end portion of said sleeve.

References Cited in the file of this patent

UNITED STATES PATENTS

| | | |
|---|---|---|
| 150,517 | Brooks | May 5, 1874 |
| 1,098,828 | Murphy | June 2, 1914 |
| 1,319,116 | Roberts | Oct. 21, 1919 |
| 1,329,827 | Crittall | Oct. 3, 1920 |
| 1,385,122 | Evans | July 19, 1921 |
| 1,511,692 | Vitek | Oct. 14, 1924 |
| 1,710,744 | Roe | Apr. 30, 1929 |
| 2,049,158 | Eckert | July 28, 1936 |
| 2,153,432 | Reich | Apr. 4, 1939 |
| 2,219,897 | Hooper | Oct. 29, 1940 |
| 2,368,735 | White | Feb. 6, 1945 |

FOREIGN PATENTS

| | | |
|---|---|---|
| 923,219 | France | July 1, 1947 |